US012731229B2

(12) United States Patent
Long et al.

(10) Patent No.: US 12,731,229 B2
(45) Date of Patent: Sep. 8, 2026

(54) IMAGE DENOISING METHOD AND SYSTEM, AND STORAGE MEDIUM

(71) Applicant: WUYI UNIVERSITY, Jiangmen (CN)

(72) Inventors: Jiale Long, Jiangmen (CN); Chuli Gan, Jiangmen (CN); Jianmin Zhang, Jiangmen (CN); Zihao Du, Jiangmen (CN); Rui Sun, Jiangmen (CN); Xiaojiang Zhan, Jiangmen (CN); Kesen Huang, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 230 days.

(21) Appl. No.: 18/710,407

(22) PCT Filed: May 12, 2022

(86) PCT No.: PCT/CN2022/092449

§ 371 (c)(1),
(2) Date: May 15, 2024

(87) PCT Pub. No.: WO2023/115792

PCT Pub. Date: Jun. 29, 2023

(65) Prior Publication Data

US 2024/0394853 A1 Nov. 28, 2024

(30) Foreign Application Priority Data

Dec. 22, 2021 (CN) ......................... 202111584391.2

(51) Int. Cl.
*G06T 5/70* (2024.01)
*G06T 5/20* (2006.01)
*G06T 7/13* (2017.01)

(52) U.S. Cl.
CPC ................. *G06T 5/70* (2024.01); *G06T 5/20* (2013.01); *G06T 7/13* (2017.01)

(58) Field of Classification Search
CPC ................ G06T 5/70; G06T 7/13; G06T 5/20
See application file for complete search history.

(56) References Cited

U.S. PATENT DOCUMENTS

2010/0111438 A1 5/2010 Chang et al.
2013/0129225 A1 5/2013 Poyil et al.
2014/0092257 A1* 4/2014 Hogasten ............... H04N 23/23 348/164

FOREIGN PATENT DOCUMENTS

CN 101841642 A 9/2010
CN 102096921 A 6/2011
(Continued)

OTHER PUBLICATIONS

International Searching Authority. International Search Report and Written Opinion for PCT Application No. PCT/CN2022/092449 and English translation, mailed Aug. 26, 2022, pp. 1-9.
(Continued)

*Primary Examiner* — Wednel Cadeau
(74) *Attorney, Agent, or Firm* — Vivacqua Crane, PLLC

(57) ABSTRACT

An image denoising method and system, and storage medium are disclosed, which relate to the technical field of image processing. The method including: performing blur processing on an image to be processed by means of empirical mode decomposition to obtain a blurred feature image; performing edge detection processing on the feature image to obtain an edge detection operator of the feature image; calculating a diffusion threshold of a preset anisotropic diffusion equation according to the edge detection operator, and determining an improved anisotropic diffusion equation according to the calculated diffusion threshold; and performing, by using the improved anisotropic diffusion equation, diffusion processing on the image to be processed to obtain denoised image information. With the above method, the impact of the image noise on edge detection
(Continued)

results can be weakened and the image denoising effect can be improved.

7 Claims, 6 Drawing Sheets

(56) References Cited

FOREIGN PATENT DOCUMENTS

| | | | | | |
|---|---|---|---|---|---|
| CN | 104392418 A | | 3/2015 | | |
| CN | 105005975 A | * | 10/2015 | ............... | G06T 5/70 |
| CN | 106815818 A | | 6/2017 | | |
| CN | 107464226 A | | 12/2017 | | |
| CN | 110458773 A | | 11/2019 | | |
| CN | 112785522 A | | 5/2021 | | |
| CN | 114240893 A | * | 3/2022 | ............... | G06T 7/60 |

OTHER PUBLICATIONS

The State Intellectual Property Office of People's Republic of China. First Office Action for CN Application No. 202111584391.2 and English translation, mailed Apr. 2, 2025, pp. 1-12.

The State Intellectual Property Office of People's Republic of China. First Office Search Report for CN Application No. 202111584391.2 and English translation, mailed Mar. 28, 2025, pp. 1-3.

The State Intellectual Property Office of People's Republic of China. Supplementary Search Report for CN Application No. 202111584391.2 and English translation, mailed Aug. 4, 2025, pp. 1-3.

* cited by examiner

IMAGE DENOISING METHOD AND SYSTEM, AND STORAGE MEDIUM

CROSS-REFERENCE TO RELATED APPLICATIONS

This application is a national stage filing under 35 U.S.C. § 371 of international application number PCT/CN2022/092449, filed May 12, 2022, which claims priority to Chinese patent application No. 202111584391.2 filed Dec. 22, 2021. The contents of these applications are incorporated herein by reference in their entirety.

TECHNICAL FIELD

The present disclosure relates to the technical field of image processing, and in particular to an image denoising method and system, and a storage medium.

BACKGROUND

In image processing, image noise reduction is an important branch, and it is a common practice to obtain a denoised image by solving an anisotropic diffusion equation on an original image. The noise can be removed with certain features being kept. The gradient operator of an image determines a diffusion speed, and is widely applied to fields such as image denoising, image segmentation and object identification. However, the gradient operator itself is highly sensitive to noise and lacks robust noise resistance, and spurious edges caused by noise cannot be distinguished. With regard to the problem that the gradient operator is not good at identifying noise, then an edge detection operator is introduced for improvement. However, due to the noise, some edges that originally do not exist may be generated, which results in an inaccurate edge detection result and thus the effect of image denoising using edge detection through an anisotropic diffusion equation is not good.

SUMMARY

The present disclosure aims to solve at least one of the technical problems in the existing technology. To this end, the present disclosure provides an image denoising method, system, and storage medium, which can weaken the effect of image noise on edge detection results and improve the image denoising effect.

In a first aspect, the present disclosure proposes an image denoising method including:

- performing blur processing on an image to be processed by means of empirical mode decomposition to obtain a blurred feature image;
- performing edge detection processing on the feature image to obtain an edge detection operator of the feature image;
- calculating a diffusion threshold of a preset anisotropic diffusion equation according to the edge detection operator, and determining an improved anisotropic diffusion equation according to the calculated diffusion threshold; and
- performing, by using the improved anisotropic diffusion equation, diffusion processing on the image to be processed to obtain denoised image information.

According to the image denoising method in an embodiment of the first aspect of the present disclosure, at least the following beneficial effects are achieved. A high-frequency part corresponding to the details of an image is removed by performing blurring processing on the image before edge detection, so that noises attached to the details of the image are eliminated; edge detection is performed on the blurred image, so that noises in the part corresponding to the details cannot generate an edge by themselves. In this way, the edge detection result is accurate, and the edge detection operator in the edge detection process is not affected by noises, and thus the operator can replace a diffusion threshold in an anisotropic diffusion equation to accurately guide the diffusion degree, and output a denoised image with better denoising effect.

According to some embodiments of the present disclosure, the performing blur processing on an image to be processed by means of empirical mode decomposition to obtain a blurred feature image includes:

- performing two-dimensional empirical mode decomposition on the image to be processed to obtain an intrinsic mode function set of the image to be processed, wherein the intrinsic mode function set comprises one image residual and a plurality of image function components arranged from high to low frequencies; and
- recombining the intrinsic mode function set, from which the image function component with the highest frequency is removed, to obtain the feature image.

According to some embodiments of the present disclosure, the performing two-dimensional empirical mode decomposition on the image to be processed to obtain an intrinsic mode function set of the image to be processed includes:

- determining an image function according to the image to be processed;
- calculating an image function component corresponding to the image function according to a preset decomposition formula;
- calculating a difference between the image function and the image function component;
- using the difference not satisfying a preset condition as a new image function, and recomputing an image function component corresponding to the new image function until the difference satisfies the preset condition;
- taking the difference calculated last time as an image residual; and
- combining the image residual and each calculated image function component to obtain the intrinsic mode function set.

According to some embodiments of the present disclosure, the calculating an image function component corresponding to the image function according to a preset decomposition formula includes:

- respectively constructing, according to a maximum value and a minimum value of the image function, a maximum value surface and a minimum value surface;
- calculating, according to the maximum value surface and the minimum value surface, to obtain a mean envelope surface;
- calculating a difference between the mean envelope surface and the image function to obtain a height difference function; and
- using the height difference function as a new image function and recalculating to obtain a new height difference function, until a mean square error between the new height difference function and the height difference function obtained by previous calculation meets a preset threshold.

According to some embodiments of the present disclosure, the performing edge detection processing on the feature image to obtain an edge detection operator of the feature image information includes:

- performing Gaussian smoothing processing on the feature image to obtain smoothed image information;
- performing gradient calculation on the smoothed image information to obtain a gradient magnitude and a gradient direction of each pixel in the smoothed image;
- performing non-maximum suppression processing, according to the gradient direction, on the corresponding gradient magnitude to obtain optimized image information;
- performing dual threshold screening processing on the optimized image information to obtain screened image information; and
- determining an edge detection operator and a corresponding edge distribution according to screened image information.

According to some embodiments of the present disclosure, the determining an edge detection operator and a corresponding edge distribution according to screened image information includes:

- performing edge tracking by hysteresis on the screened image information to obtain a valid edge set; and
- determining an edge operator and a corresponding edge distribution according to the valid edge set.

According to some embodiments of the present disclosure, a diffusion coefficient of the improved anisotropic diffusion equation characterizes the relationship between a pixel of the image to be processed and a gradient operator.

According to some embodiments of the present disclosure, the performing, by using the improved anisotropic diffusion equation, diffusion processing on the image to be processed to obtain denoised image information includes:

- obtaining a number of calculations for the improved anisotropic diffusion equation;
- performing, by using the improved anisotropic diffusion equation, diffusion processing on the image to be processed to output a first-time diffusion image;
- using the diffusion image as a new image to be processed, and performing diffusion processing again until the number of times of diffusion processing matches a preset calculation number or the diffusion image satisfies a preset condition; and
- using the diffusion image obtained by the last diffusion processing as the denoised image information.

In a second aspect, the present disclosure provides an image denoising system, including: at least one memory, at least one processor, and at least one program, wherein the program is stored in the memory, and the processor is configured to execute the at least one program to implement the image denoising method described in the above embodiments.

The image denoising system according to an embodiment of the second aspect of the present disclosure has at least the following beneficial effects. A high-frequency part corresponding to the details of an image is removed by performing blurring processing on the image before edge detection, so that noises attached to the details of the image are eliminated; edge detection is performed on the blurred image, so that noises in the part corresponding to the details cannot generate an edge by themselves. In this way, the edge detection result is accurate, and the edge detection operator in the edge detection process is not affected by noises, and thus the operator can replace a diffusion threshold in an anisotropic diffusion equation to accurately guide the diffusion degree, and output a denoised image with better denoising effect.

In a third aspect, the present disclosure provides a computer-readable storage medium. The computer-readable storage medium stores a computer executable signal, where the computer executable signal is used to execute the image denoising method described in the above embodiments.

The computer-readable storage medium according to an embodiment of the third aspect of the present disclosure has at least the following beneficial effects. A high-frequency part corresponding to the details of an image is removed by performing blurring processing on the image before edge detection, so that noises attached to the details of the image are eliminated; edge detection is performed on the blurred image, so that noises in the part corresponding to the details cannot generate an edge by themselves. In this way, the edge detection result is accurate, and the edge detection operator in the edge detection process is not affected by noises, and thus the operator can replace a diffusion threshold in an anisotropic diffusion equation to accurately guide the diffusion degree, and output a denoised image with better denoising effect.

Additional aspects and advantages of the present disclosure will be given in part in the following descriptions, become apparent in part from the following descriptions, or be learned from practice of the present disclosure.

BRIEF DESCRIPTION OF DRAWINGS

Additional aspects and advantages of the present disclosure will become apparent and more readily appreciated from the following description of embodiments, taken in conjunction with the accompanying drawings, in which.

DETAILED DESCRIPTION

To make the objectives, technical solutions, and advantages of the present disclosure clearer and more comprehensible, the following further describes the present disclosure in detail with reference to the accompanying drawings and embodiments. It should be appreciated that the embodiments described herein are only intended to explain the present disclosure, but not to limit the present disclosure.

In the description of the present disclosure, the meaning of "several" is one or more, the meaning of "a plurality of" is two or more. The terms such as "greater than", "less than", "greater than", etc. should be interpreted as not including the following number, while the terms such as above, below, within, etc. should be interpreted as including the following number. The terms such as first and second if described are only for the purpose of distinguishing technical features, they cannot be interpreted as indicating or implying relative importance, or implicitly indicating the number of the indicated technical features or implicitly indicating the precedence relationship of the indicated technical features.

Figure 1:
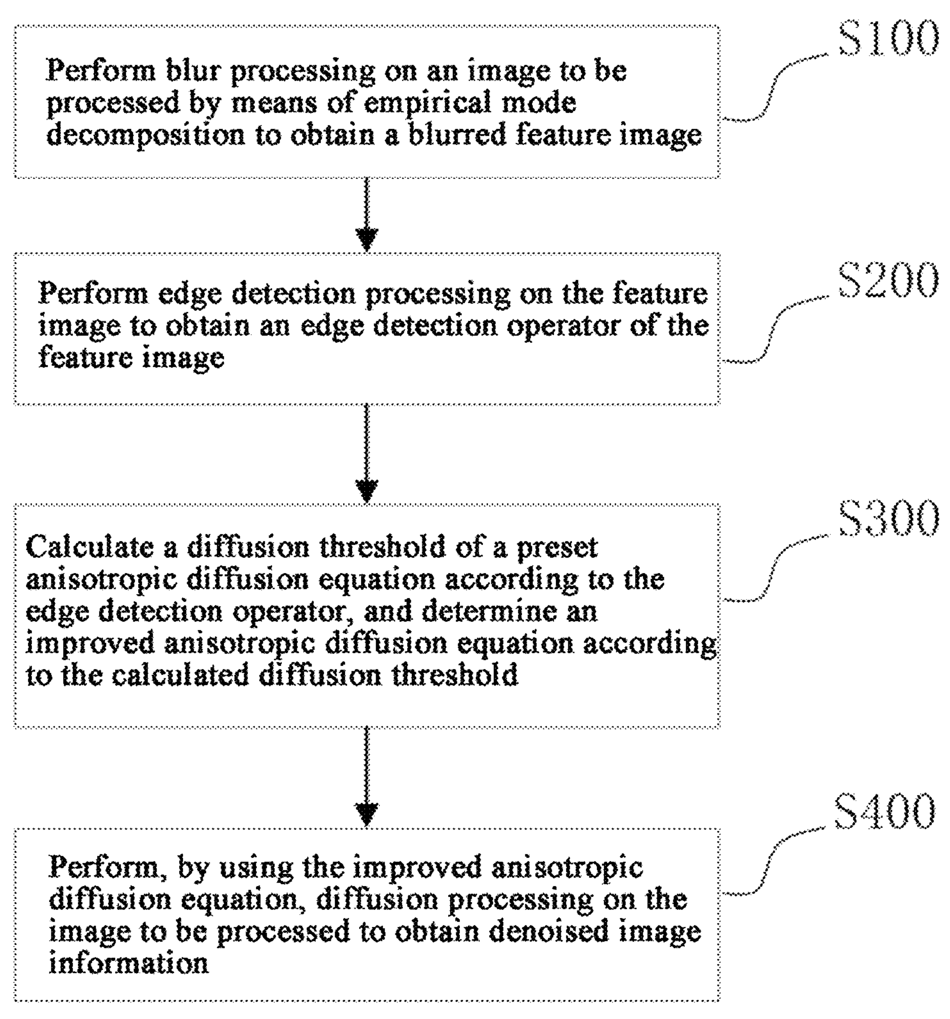
FIG. 1 is a flowchart of an image denoising method according to an embodiment of the present disclosure.

Referring to FIG. 1, in a first aspect, the present disclosure provides an image denoising method, including but not limited to the following steps:

Step S100: performing blur processing on an image to be processed by means of empirical mode decomposition to obtain a blurred feature image.

In some embodiments, a two-dimensional empirical mode decomposition is performed on an image to be processed, so that the image to be processed is divided into a plurality of different components according to frequencies, and components required in subsequent steps are extracted according to requirements. In the present disclosure, by removing components related to image details from the above components, the basic contours of the image are retained, thereby performing blur processing on the image to obtain a blurred feature image information.

Step S200: performing edge detection processing on the feature image to obtain an edge detection operator of the feature image.

In some embodiments, the obtained blurred feature image includes only the base features and contours of the image, the noise part coexisting with the image details has been removed. Through edge detection of the feature image and selecting a reasonable edge detection operator to guide the detection process to obtain an edge distribution having a functional relationship with the edge detection operator, the edge distribution is used for subsequent improvement of the anisotropic diffusion equation.

Step S300: calculating a diffusion threshold of a preset anisotropic diffusion equation according to the edge detection operator, and determining an improved anisotropic diffusion equation according to the calculated diffusion threshold.

It can be appreciated that the edge detection operator contains function information of the edge distribution, and by replacing the gradient operator of the anisotropic diffusion equation with the edge detection operator to guide the diffusion speed and degree of the anisotropic diffusion equation, the anisotropic diffusion equation is improved.

In some embodiments, the original anisotropic diffusion equation is expressed as:

$$\frac{\partial I(x, y, t)}{\partial t} = div(c|\nabla I(x, y, t)| * \nabla I(x, y, t))$$

where I(x, y, 0) is an initial image, i.e., an image to be processed, div represents a divergence computation operator, and □ represents a gradient computation operator; c represents a diffusion coefficient, and controls a diffusion speed of P-M (anisotropic diffusion equation). A canny operator of the edge detection guides an edge distribution obtained in the edge detection processing to be substituted into the anisotropic diffusion equation, so that a new diffusion threshold is generated together with a gradient operator, and the new diffusion equation is guided to complete a denoising process. The improved anisotropic diffusion equation is:

$$\frac{\partial I(x, y, t)}{\partial t} = div((1 - K(x, y, t)) * c(|\nabla I(x, y, t)|) * \nabla I(x, y, t))$$

where K represents a canny operator, and in an edge area, K approaches 1, the speed of the diffusion equation slows down, and detail information is preserved; in a non-edge area, K approaches 0, the diffusion speed is accelerated, and the effect of denoising is achieved.

Step S400: performing, by using the improved anisotropic diffusion equation, diffusion processing on an image to be processed to obtain denoised image information.

In some embodiments, a high-frequency part corresponding to the details of the image is removed by performing degradation processing on the image before edge detection, so that noises attached to the details of the image are eliminated. Edge detection is performed on the degraded image, so that noises in the part corresponding to the details cannot generate an edge by themselves. In this way, the edge detection result is accurate, and the edge detection operator in the edge detection process is not affected by noises, and thus the operator can replace a diffusion threshold in an anisotropic diffusion equation to accurately guide the diffusion degree, and output a denoised image with better denoising effect.

According to an embodiment of the first aspect of the present disclosure, at least the following beneficial effects are achieved. A high-frequency part corresponding to the details of an image is removed by performing blurring processing on the image before edge detection, so that noises attached to the details of the image are eliminated. Edge detection is performed on the blurred image, so that noises in the part corresponding to the details cannot generate an edge by themselves. In this way, the edge detection result is accurate, and the edge detection operator in the edge detection process is not affected by noises, and thus the operator can replace a diffusion threshold in an anisotropic diffusion equation to accurately guide the diffusion degree, and output a denoised image with better denoising effect.

Figure 2:
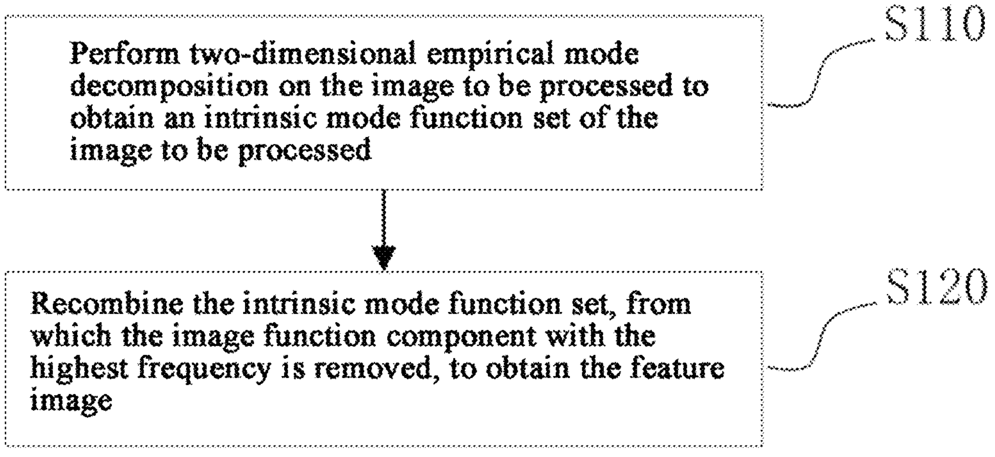
FIG. 2 is a detailed flow chart of the Step S100 in FIG. 1 according to the present disclosure.

It may be appreciated that, referring to FIG. 2, FIG. 2 is a schematic diagram of an embodiment of a detailed process of Step S100 in FIG. 1, and Step S100 includes:

Step S110: performing two-dimensional empirical mode decomposition on the image to be processed to obtain an intrinsic mode function set of the image to be processed.

It should be noted that, for a segment of an unknown signal, the empirical mode decomposition can be directly started without the need of pre-analysis and study. This method will automatically be graded according to some fixed pattern, without the need for manual setup and intervention. The decomposed intrinsic mode function is based on characteristics of the signal, and may be subsequently studied for specific frequency information. Since the analysis object of the present disclosure is a picture, a two-dimensional empirical mode decomposition for picture analysis is adopted.

Step S120: recombining the intrinsic mode function set, from which the image function component with the highest frequency is removed, to obtain the feature image.

In some embodiments, the intrinsic mode function components affecting subsequent edge detection precision are removed by picking and recombining the resolved intrinsic mode functions, the remaining intrinsic mode functions are recombined to accurately control the image blurring processing and avoid the uncontrollable degree of blurring, where too little blurring results in excessive noise, while too much blurring leads to the loss of information required for subsequent edge detection.

It should be noted that Step S100 includes but is not limited to Step S110 and Step S120.

Figure 3:
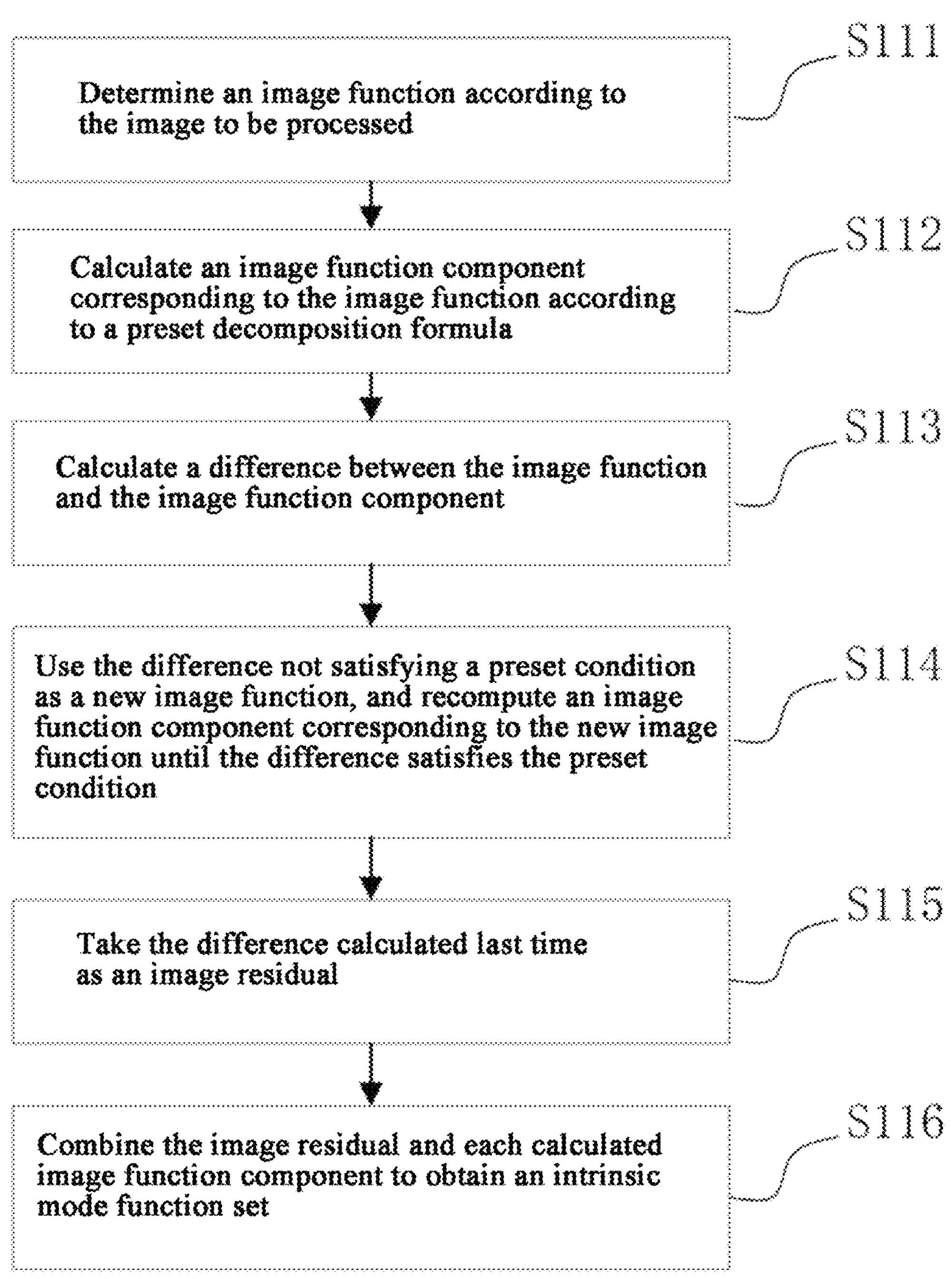
FIG. 3 is a detailed flow chart of Step S110 in FIG. 2 according to the present disclosure.

It can be appreciated that, referring to FIG. 3, FIG. 3 is a schematic diagram of an embodiment of a detailed process of Step S110 in FIG. 2, and Step S110 includes, but is not limited to, Step S111, Step S112, Step S113, Step S114, Step S115, and Step S116.

Step S111: determining an image function according to the image to be processed.

In some embodiments, it is assumed that the image to be processed is f(x,y), which is a function of the pixels of the image.

Step S112: calculating an image function component corresponding to the image function according to a preset decomposition formula.

Step S113: calculating a difference between the image function and the image function component.

In some embodiments, difference calculation is performed on an image function obtained by means of some decomposition rules and an image function generated in a previous decomposition process, and the difference is denoted as a new image function. Meanwhile, when the difference in each cycle satisfies a specific preset condition, the difference in that cycle is denoted as an intrinsic mode function in a two-dimensional empirical mode decomposition process.

Step S114: use the difference not satisfying a preset condition as a new image function, and recomputing an image function component corresponding to the new image function until the difference satisfies the preset condition.

Step S115: taking the difference calculated last time as an image residual.

It can be appreciated that after the above Step S114 undergoes multiple cycles, a plurality of new image functions are generated, i.e., the described difference, there is also a case where the difference cannot be used as a new image function, $r_1(x,y)$ is denoted as an image remained after the first image function component is removed from the image f(x,y), $r_1(x,y)$ is denoted as a new image function input, steps S111, S112 and S113 are repeated. In this way, the second difference may be obtained, and assuming that the first image function component is $C_1(x,y)$, then $r_1(x,y)=f(x,y)-C_1(x,y)$. After the above steps are cycled for n times, when $r_n(x,y)$ and $C_n(x,y)$ are smaller than a predetermined error or $r_n(x,y)$ is a monotonic function, and the image function component cannot be extracted from the image f(x,y), $r_n(x,y)$ at this time represents an average trend of a slow change of the image, and $r_n(x,y)$ at this time is used as a last calculated image residual.

Step S116: combining the image residual and each calculated image function component to obtain an intrinsic mode function set. In some embodiments, the original image f(x,y) may be represented as:

$$f(x, y) = \sum_{i=1}^{n} C_i(x, y) + r_n$$

It should be noted that the feature image in Step S120 may be expressed as:

$$f_2(x, y) = \sum_{i=2}^{n} C_i(x, y) + r_n$$

Figure 4:
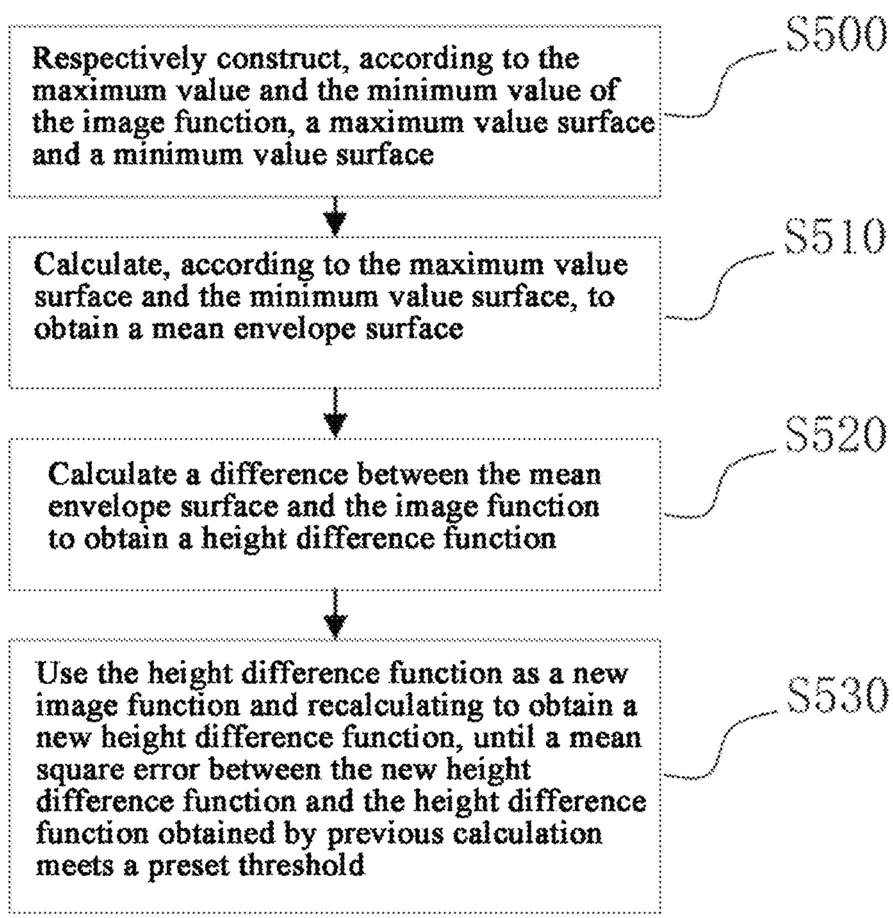
FIG. 4 is a detailed flow chart of Step S112 in FIG. 3 according to the present disclosure.

It may be appreciated that, referring to FIG. 4, FIG. 4 is a schematic diagram of an embodiment of a detailed flow of Step S112 in FIG. 3, and Step S112 includes, but is not limited to, Step S500, Step S510, Step S520, and Step S530.

Step S500: respectively constructing, according to the maximum value and the minimum value of the image function, maximum value surfaces and minimum value surfaces.

In some embodiments, the maximum value and the minimum value in the image f(x,y) are first searched for, and the maximum value surface u(x,y) and the minimum value surface v(x,y) are constructed by interpolation.

Step S510: calculating, according to the maximum value surface and the minimum value surface, to obtain a mean envelope surface.

In some embodiments, a mean formula for the maximum value surface and the minimum value surface is solved, and the specific expression is:

$$e_1(x, y) = \frac{u(x, y) + v(x, y)}{2}$$

Step S520: calculating a difference between the mean envelope surface and the image function to obtain a height difference function.

In some embodiments, the difference between $e_1(x,y)$ and f(x,y) is denoted as $h_1(x,y)$, then:

$$h_1(x, y) = f(x, y) - e_1(x, y)$$

Step S530: using the height difference function as a new image function and recalculating to obtain a new height difference function, until a mean square error between the new height difference function and the height difference function obtained by previous calculation meets a preset threshold.

In some embodiments, f(x,y) is replaced by $h_1(x,y)$ as a new input, steps S500 to S513 are repeated, and assuming that the above steps are repeated for K times, the calculation for the threshold satisfied by the condition of stopping the above repetitions is:

$$SD = \sum_{x=1}^{X} \sum_{y=1}^{Y} \frac{|h_{1(k-1)}(x, y) - h_{1k}(x, y)|^2}{h_{1k}^2(x, y)}$$

where SD represents a threshold, and the range thereof is set to be between 0.1 and 0.5. When the above steps are repeated for K times, and the value of SD satisfies a specified range, cycling of steps S500 to S513 are ended. The obtained $h_{lk}(x,y)$ at this time is an intrinsic mode function (IMF), that is, the image function component mentioned in the above Step S114, which is an image function component containing the highest frequency of the image f(x,y), and is denoted as $c_1(x,y)$.

Figure 5:
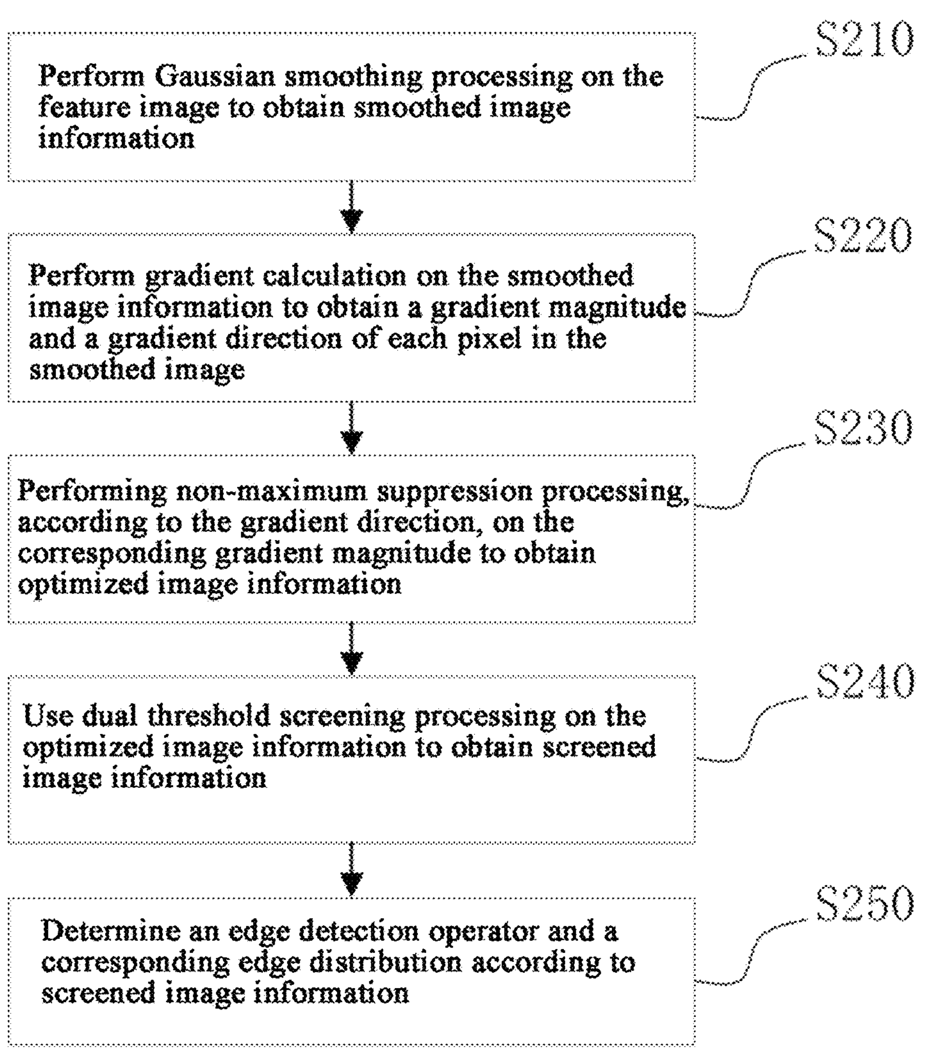
FIG. 5 is a detailed flowchart of Step S200 in FIG. 1 according to the present disclosure.

It may be appreciated that, referring to FIG. 5, FIG. 5 is a schematic diagram of an embodiment of a detailed process of Step S200 in FIG. 1, and Step S200 includes, but is not limited to, Step S210, Step S220, Step S230, Step S240, and Step S250.

Step S210: performing Gaussian smoothing processing on the feature image to obtain smoothed image information.

In some embodiments, the above feature image obtained by means of two-dimensional empirical mode decomposition is filtered, smoothing processing is performed by using a Gaussian filter, and image pre-noise reduction is preliminarily performed. This process makes the edges of the feature image smoother, thus mitigating potential significant errors in subsequent edge detection results.

Step S220: performing gradient calculation on the smoothed image information to obtain a gradient magnitude and a gradient direction of each pixel in the smoothed image.

In some embodiments, the gradient is a difference between two adjacent pixel values, and the differences in both X and Y directions need to be calculated, and a gradient G and a gradient direction θ of a pixel can be finally obtained, where $G=\sqrt{G_x^2+G_y^2}$, which is simplified as $G=|Gx|+|Gy|$; and $\theta=\arctan(Gy/Gx)$.

Step S230: performing non-maximum suppression processing, according to the gradient direction, on the corresponding gradient magnitude to obtain optimized image information.

In some embodiments, non-maximum suppression refers to changing a "fat" edge into a "thin edge", and all the places where gray-scale is changed are relatively concentrated, and the changes excluding the greatest gray-scale change in a gradient direction within a local range are not retained, so that a multi-pixel edge can be changed into an edge with a single pixel width.

Step S240: using dual threshold screening processing on the optimized image information to obtain screened image information.

In some embodiments, an upper threshold and a lower threshold are generally set. When an edge pixel value is greater than the upper threshold, the edge pixel value is denoted as a strong edge. When the edge pixel value is greater than the lower threshold and less than the upper threshold, the edge pixel value is denoted as a weak edge. When the edge pixel value is less than the lower threshold, the edge pixel value is removed. In the present disclosure, an upper threshold value and a lower threshold value are automatically fed back via a library function, and if pixels are distributed according to 0 to 1, the upper threshold value is 0.1563, and the lower threshold value is 0.0625.

Step S250: determining an edge detection operator and a corresponding edge distribution according to screened image information.

It can be appreciated that, by means of the processing in the above steps, the edge distribution of the feature image input for edge detection is represented in the form of an edge detection operator, thereby completing the edge detection. In some embodiments, the present disclosure employs a canny detection operator.

Figure 6:
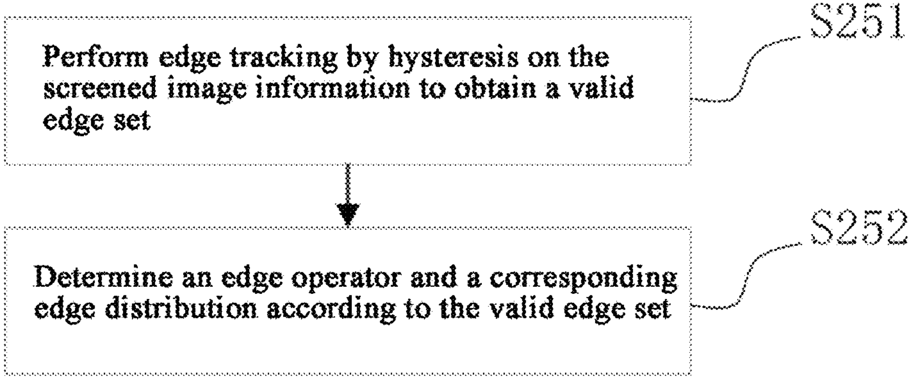
FIG. 6 is a detailed flowchart of Step S250 in FIG. 5 according to the present disclosure.

It may be appreciated that, referring to FIG. 6, FIG. 6 is a schematic diagram of an embodiment of a detailed process of Step S250 in FIG. 5, and Step S250 includes, but is not limited to, Step S251 and Step S252.

Step S251: performing edge tracking by hysteresis on the screened image information to obtain a valid edge set.

It may be appreciated that, in the above edge detection processing, the edge type may be divided into a strong edge and a weak edge, where the strong edge may be considered as a true edge, while the weak edge may be a true edge, and may also be a false edge caused by noise or color conversion. It is generally considered that a weak edge caused by a true edge is connect with a strong edge, while a weak edge caused by noise is not. Therefore, edge tracking by hysteresis needs to be performed. By detecting 8 connected adjacent pixels of a weak edge, as long as a strong edge point exists, the weak edge is considered to be true and needs to be remained, so that a valid edge set is defined.

Step S252: determining an edge operator and a corresponding edge distribution according to the valid edge set.

It can be appreciated that the diffusion coefficient of the improved anisotropic diffusion equation characterizes the relationship between a pixel of the image to be processed and a gradient operator. In some embodiments, the diffusion coefficient represents a diffusion speed of an anisotropic diffusion equation. Tn edge detection operator guides an edge detection processing. The output edge distribution is a function of the edge detection operator, and the function forms a new diffusion threshold in combination with the diffusion coefficient, to obtain an improved anisotropic diffusion equation.

Figure 7:
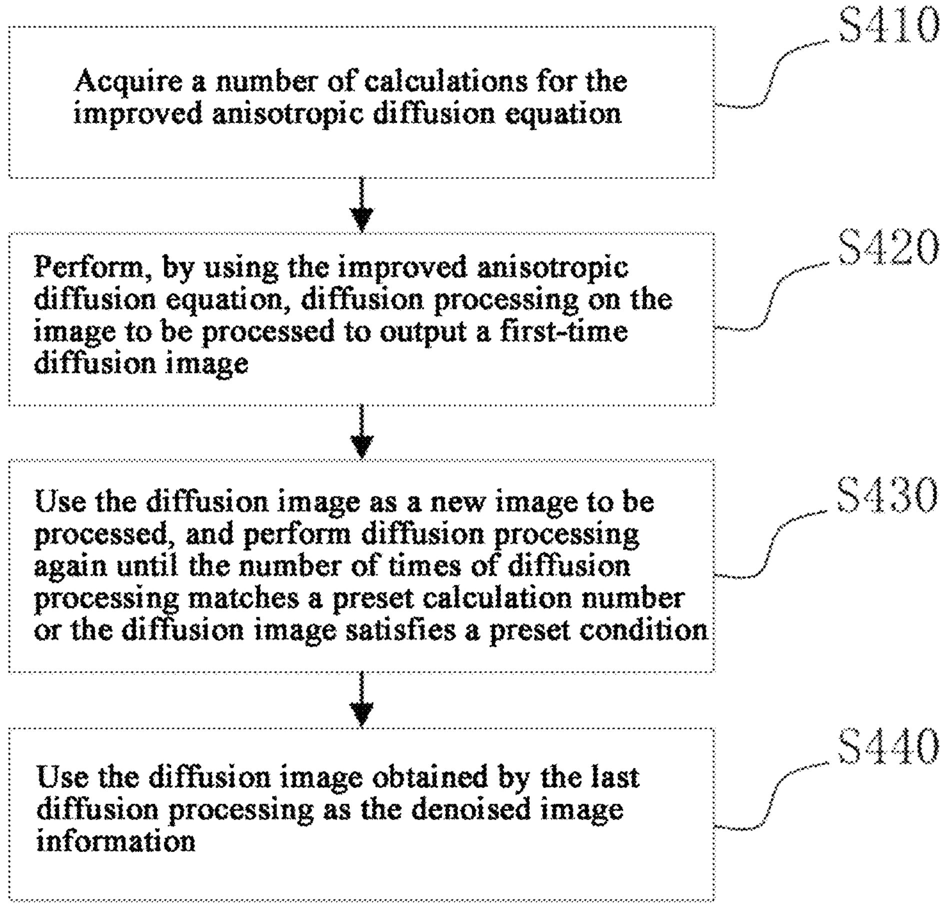
FIG. 7 is a detailed flowchart of Step S400 in FIG. 1 according to the present disclosure.

It may be appreciated that, referring to FIG. 7, FIG. 7 is a schematic diagram of an embodiment of a detailed process of Step S400 in FIG. 1, and Step S400 includes but is not limited to Step S410, Step S420, Step S430, and Step S440.

Step S410: acquiring a number of calculations for the improved anisotropic diffusion equation.

In some embodiments, the preset initial number of calculations in the present disclosure is five. It can be appreciated that, by performing a small number of cycles first, it is observed whether an output image initially meets a denoising requirement, and then a subsequent judgment of an output condition is performed.

Step S420: performing, by using the improved anisotropic diffusion equation, diffusion processing on the image to be processed to output a first-time diffusion image.

Step S430: using the diffusion image as a new image to be processed, and performing diffusion processing again until the number of times of diffusion processing matches a preset calculation number or the diffusion image satisfies a preset condition.

Step S440: using the diffusion image obtained by the last diffusion processing as the denoised image information.

In some embodiments, a peak signal-to-noise ratio of an original image is compared with a peak signal-to-noise ratio of a denoised image, and when the peak signal-to-noise ratio of the denoised image is greater than the peak signal-to-noise ratio of the original image, it indicates that the denoised image is ideal and can be output as a final denoised image. A peak signal-to-noise ratio (PSNR) is used as an index analysis, which is an apparent image evaluation index, and is based on an error between corresponding pixels. The greater the PSNR, the smaller the distortion degree, and the closer to a true image, and a calculation formula is as follows:

$$PSNR = 10 * \log_{10} \frac{M * N}{(f_2(x, y) - f(x, y))^2}$$

where, $f_2(x,y)$ is an image diffused by the improved anisotropic diffusion equation after the blur processing, $f(x,y)$ is an image to be processed, M and N are respectively the sizes of the corresponding images, at this time, the value of the PSNR can be taken as one of the circulation conditions (preset conditions) for stopping the diffusion processing, and when the PSNR of the diffused image output in Step S420 satisfies the preset PSNR, the diffusion processing can be ended.

In a second aspect, the present disclosure further provides an image optimization system including at least one memory, at least one processor and at least one program, where the program is stored in the memory, and the processor executes the one or more programs to implement the above image denoising method.

With the image optimization system and using the optimization method therefor, a high-frequency part corresponding to the details of an image is removed by performing blurring processing on the image before edge detection, so that noises attached to the details of the image are eliminated. Edge detection is performed on the blurred image, so that noises in the part corresponding to the details cannot generate an edge by themselves. In this way, the edge detection result is accurate, and the edge detection operator in the edge detection process is not affected by noises, and thus the operator can replace a diffusion threshold in an anisotropic diffusion equation to accurately guide the diffusion degree, and output a denoised image with better denoising effect.

Figure 8:
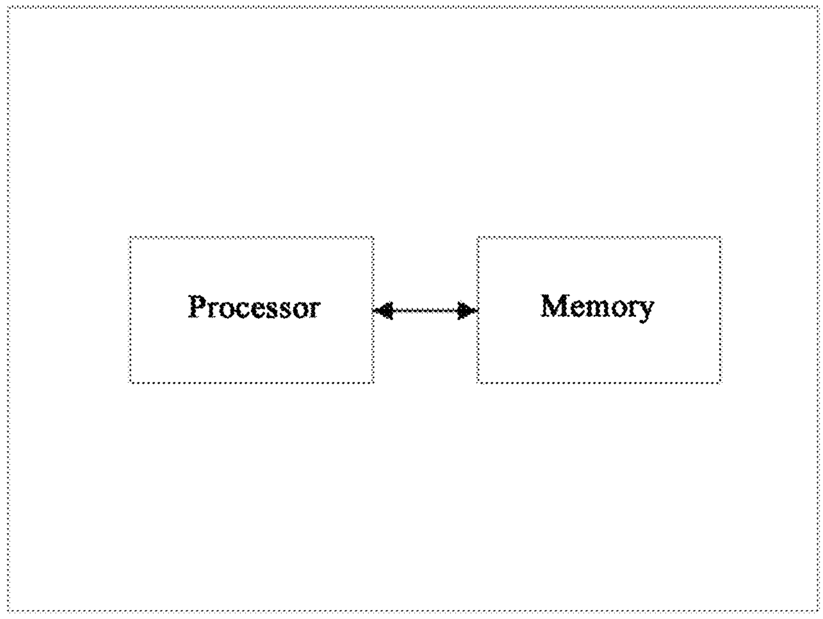
FIG. 8 is a schematic structural diagram of an image denoising system according to the present disclosure.

The processor and the memory may be connected by using a bus or the like. In FIG. 8, one processor is taken as an example, and a bus connection is used as an example.

As a non-transient computer-readable storage medium, the memory may be configured to store a non-transient software program, a non-transient computer executable program, and a signal, such as a program instruction/signal corresponding to the processing module in an embodiment of the present disclosure. The processor executes various function applications and data processing by running a non-transient software program, instructions and signals stored in the memory, to implement the image denoising method in the above method embodiments.

The memory may include a storage program area and a storage data area. The storage program area may store an operating system and an application program required by at least one function. The data storage area may store relevant data of the above image denoising method, etc. In addition, the memory may include a high-speed random-access memory, and may also include a non-transient memory, for example, at least one magnetic disk storage device, a flash memory device, or another non-transient solid-state storage device. In some embodiments, the memory may optionally include memory remotely located relative to the processor, and these remote memories may be connected to the processing module over a network. Examples of such networks include, but are not limited to, the Internet, intranets, local area networks, mobile communication networks, and combinations thereof.

One or more signals are stored in a memory, and when the one or more signals are executed by one or more processors, the image denoising method in any of the above method embodiments is performed. For example, the above-described method steps S100 to S400 in FIG. 1, method steps S110 to S120 in FIG. 2, method steps S111 to S116 in FIG. 3, method steps S500 to S530 in FIG. 4, Step S210 to Step S250 in FIG. 5, Step S251 to Step S252 in FIG. 6, and Step S410 to Step S440 in FIG. 7 are performed.

In a third aspect, an embodiment of the present disclosure provides a computer-readable storage medium. The computer-readable storage medium stores a computer-executable instruction, and the computer-executable instruction is executed by one or more processors, so that the one or more processors can execute the image denoising method in the above method embodiments. For example, the method steps S100 to S400 in FIG. 1, the method steps S110 to S120 in FIG. 2, the method steps S111 to S116 in FIG. 3, the method steps S500 to S530 in FIG. 4, the steps S210 to S250 in FIG. 5, the steps S251 to S252 in FIG. 6 and the steps S410 to S440 in FIG. 7 are performed.

The apparatus embodiments described above are merely exemplary, and the units described as separate parts may or may not be physically separated, and parts displayed as units may or may not be physical units, may be located in one position, or may be distributed on a plurality of network units. A part or all of the units may be selected according to actual requirements to achieve the objectives of the solutions of the embodiments.

Through the description of the above embodiments, a person of ordinary skill in the art may understand that all or some of the steps in the methods and systems disclosed above may be implemented as software, firmware, hardware, and a proper combination thereof. Some or all of the physical components may be implemented as software executed by a processor, such as a central processor, digital signal processor, or microprocessor, or as hardware, or as an integrated circuit, such as an application specific integrated circuit. Such software may be distributed on computer-readable media, which may include computer storage media (or non-transient media) and communication media (or transient media). As is well known to those of ordinary skill in the art, the term computer storage medium includes both volatile and nonvolatile, removable and non-removable medium implemented in any method or technology for storage of information such as computer-readable signals, data structures, program modules or other data. Computer storage medium includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication medium typically contains computer-readable signals, data structures, program modules, or other data in a modulated data signal such as a carrier wave or other transport mechanism and may include any information delivery medium as is known to those of ordinary skill in the art.

Although the embodiments of the present disclosure have been described in detail with reference to the drawings, the present disclosure is not limited to the above embodiments, and various changes may be made without departing from the gist of the present disclosure within the scope of knowledge of a person of ordinary skill in the art.

What is claimed is:

1. An image denoising method, comprising:

performing blur processing on an image to be processed by means of empirical mode decomposition to obtain a blurred feature image;

performing edge detection processing on the feature image to obtain an edge detection operator of the feature image;

calculating a diffusion threshold of a preset anisotropic diffusion equation according to the edge detection operator, and determining an improved anisotropic diffusion equation according to the calculated diffusion threshold; and performing, by using the improved anisotropic diffusion equation, diffusion processing on the image to be processed to obtain denoised image information;

wherein the performing blur processing on an image to be processed by means of empirical mode decomposition to obtain a blurred feature image comprises:

performing two-dimensional empirical mode decomposition on the image to be processed to obtain an intrinsic mode function set of the image to be processed, wherein the intrinsic mode function set comprises one image residual, a plurality of image function components arranged from high to low frequencies; and recombining the intrinsic mode function set, from which the image function component with the highest frequency is removed, to obtain the feature image;

wherein the performing two-dimensional empirical mode decomposition on the image to be processed to obtain an intrinsic mode function set of the image to be processed comprises:

determining an image function according to the image to be processed;

calculating an image function component corresponding to the image function according to a preset decomposition formula;

calculating a difference between the image function and the image function component;

using the difference not satisfying a preset condition as a new image function, and recomputing an image function component corresponding to the new image function until the difference satisfies the preset condition;

taking the difference calculated last time as an image residual; and combining the image residual and each calculated image function component to obtain the intrinsic mode function set;

wherein the calculating an image function component corresponding to the image function according to a preset decomposition formula comprises:

respectively constructing, according to a maximum value and a minimum value of the image function, a maximum value surface and a minimum value surface;

calculating, according to the maximum value surface and the minimum value surface, to obtain a mean envelope surface;

calculating a difference between the mean envelope surface and the image function to obtain a height difference function; and using the height difference function as a new image function and recalculating to obtain a new height difference function, until a mean square error between the new height difference function and the height difference function obtained by previous calculation meets a preset threshold.

2. The image denoising method according to claim 1, wherein the performing edge detection processing on the feature image to obtain an edge detection operator of the feature image comprises:

performing Gaussian smoothing processing on the feature image to obtain smoothed image information;

performing gradient calculation on the smoothed image information to obtain a gradient magnitude and a gradient direction of each pixel in the smoothed image;

performing non-maximum suppression processing, according to the gradient direction, on the corresponding gradient magnitude to obtain optimized image information;

performing dual threshold screening processing on the optimized image information to obtain screened image information; and determining an edge detection operator and a corresponding edge distribution according to the screened image information.

3. The image denoising method according to claim 1, wherein a diffusion coefficient of the improved anisotropic diffusion equation characterizes the relationship between a pixel of the image to be processed and a gradient operator.

4. The image denoising method according to claim 1, wherein the performing, by using the improved anisotropic diffusion equation, diffusion processing on the image to be processed to obtain denoised image information comprises:

obtaining a number of calculations for the improved anisotropic diffusion equation;

performing, by using the improved anisotropic diffusion equation, diffusion processing on the image to be processed to output a first-time diffusion image;

using the diffusion image as a new image to be processed, and performing diffusion processing again until a number of times of diffusion processing matches a preset calculation number or the diffusion image satisfies a preset condition; and using the diffusion image obtained by a last diffusion processing as the denoised image information.

5. An image denoising system, comprising:

at least one memory;

at least one processor;

at least one program;

wherein the program is stored in the memory, and the processor is configured to execute the at least one program to implement the image denoising method according to claim 1.

6. A non-transitory computer-readable storage medium, wherein the computer-readable storage medium stores a computer executable signal, and the computer executable signal is used to execute the image denoising method according to claim 1.

7. The image denoising method according to claim 2, wherein the determining an edge detection operator and a corresponding edge distribution according to the screened image information comprises:

performing edge tracking by hysteresis on the screened image information to obtain a valid edge set; and determining an edge operator and a corresponding edge distribution according to the valid edge set.

* * * * *